Oct. 31, 1939.  D. H. BLAIR  2,178,161
STRAINER CLEANER
Filed Dec. 24, 1936    2 Sheets-Sheet 2

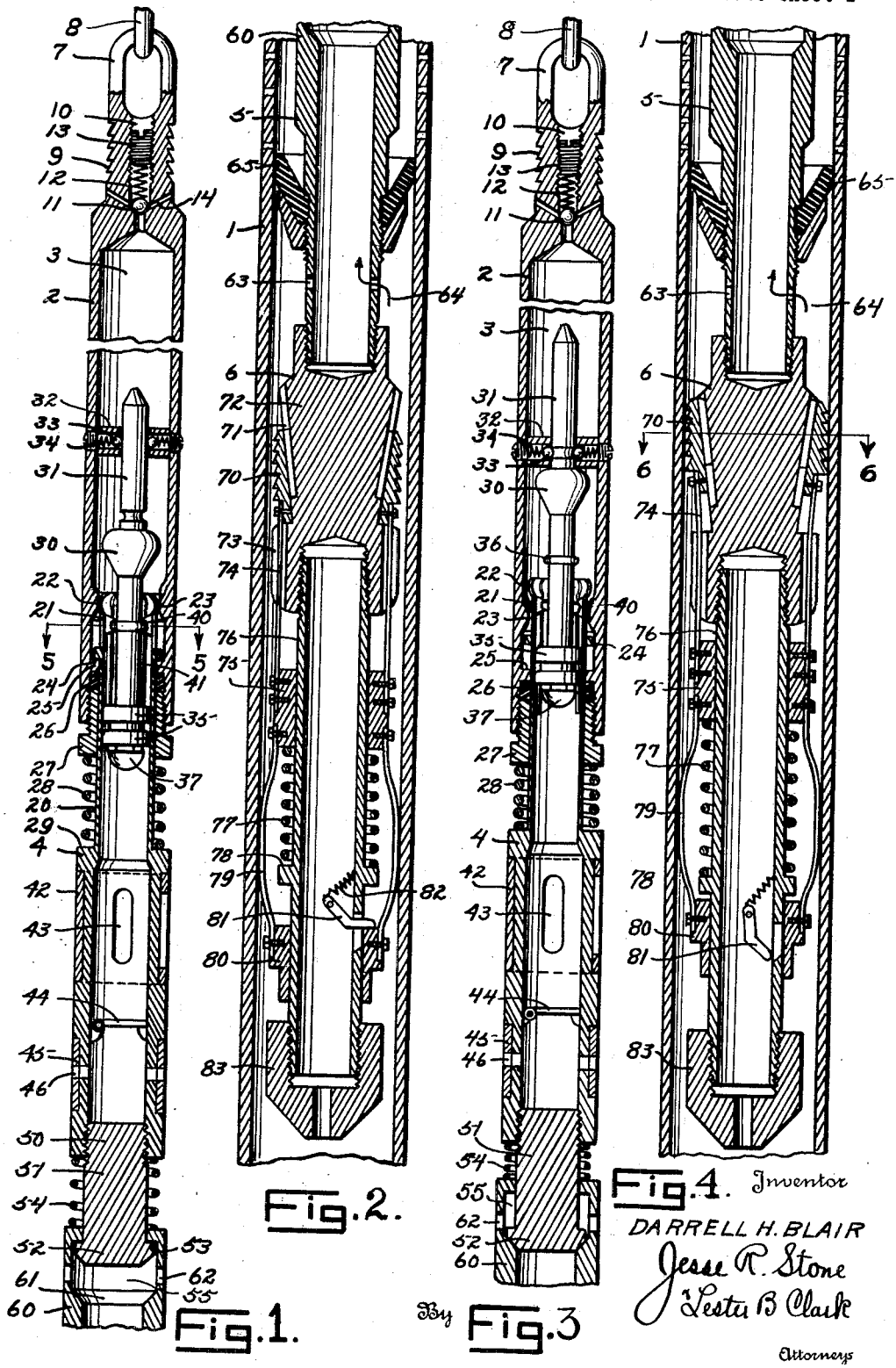

Inventor
DARRELL H. BLAIR
By Jesse R Stone
Lester B Clark
Attorneys

UNITED STATES PATENT OFFICE 2,178,161

STRAINER CLEANER

Darrell H. Blair, Houston, Tex., assignor, by mesne assignments, to John Grant, Los Angeles, Calif.

Application December 24, 1936, Serial No. 117,443

15 Claims. (Cl. 166—20)

The invention relates to cleaners for perforated casing or oil well screens and to means for removing paraffin, rotary mud and other impediments which tend to clog the pores of oil sands and retard the flow of oil therethrough.

Perforated casings and screens are used for admitting the fluid from oil bearing strata to the interior of the well casing of oil wells. These casings and screens tend to become clogged with sand and other debris that packs against the outside of the casing by the flow of oil through the perforations. Furthermore, the seepage holes from the producing formation itself or between it and a casing likewise tend to become clogged and thus free seepage of the product of the well into the screen is retarded or prevented. Various methods and means have been resorted to for this clogged condition and have met with varying degrees of success.

I have found that the outlined condition can be obviated in a novel manner of removing the material from the screen perforations and the seepage pores and by rearrangement of subjacent detritus whereby the free flow and seepage of oil to and through the casing results. In fact, by means of my process and mechanism I have been able to more than double the output of producing wells with but a small amount of equipment and with little expense and delay.

The general object of the invention is to provide a method and apparatus for effectively removing debris from the openings or perforations in casings and screens.

A more specific object is that of accomplishing effective removal of debris by sealing a well bore adjacent the point where cleaning is to be effected and applying violent suction whereby clogging material is rearranged and, in part, drawn through the screen openings.

It is also an object of the invention to apply violent suction above a seal in the well bore and to closely succeed such suction with a surge outwardly through the screen openings.

Another general object is to provide a device that can be operated by ordinary well pulling equipment and crew without the aid of pumps or other surface or subsurface accessories.

Still another object is to provide a device that may be anchored at any predetermined level in the well bore and that will seal the well bore below and adjacent the perforations to be cleaned whereby violent suction and an outward surge of fluid below the seal may be successfully produced to effectively clean the openings leading from the producing formations into the casing.

The details in construction of preferred forms of the invention, together with other attendant objects, will be apparent from the description of the accompanying drawings which are presented as illustrative only and in which:

Fig. 1 is a vertical section of the upper portion of the device with parts shown in relative position as the device is being lowered into a well.

Fig. 2 is a vertical section comprising continuation of the sectional view in Fig. 1 but also showing the relation of the device to the well casing.

Figs. 3 and 4 are similar to Figs. 1 and 2 but show the parts in position after the cleaning steps have been taken.

Figures 7, 8:
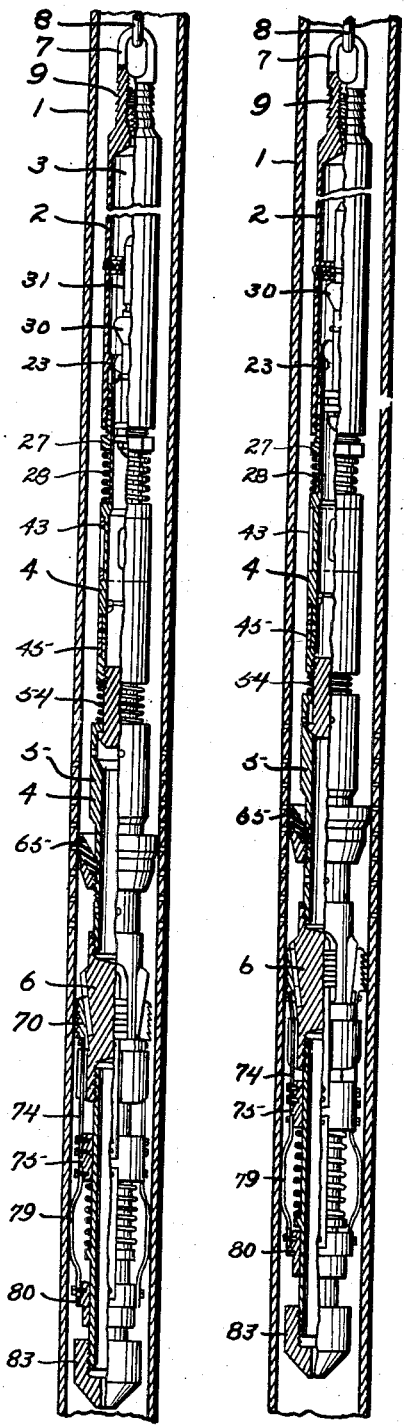
Figs. 7 and 8 are elevational views partly in section showing the association of the device with the well casing, the respective views illustrating the relative position of parts before and after actuation to effect cleaning.
Figure 5:
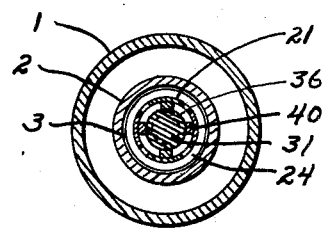
Fig. 5 is a section taken on line 5—5 of Fig. 1, including a section of the casing in its position relative to the cleaning device.
Figure 6:
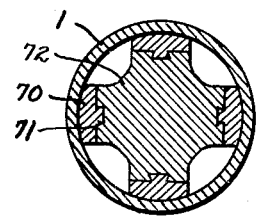
Fig. 6 is a sectional view taken on the line 6—6 of Fig. 4.

Before proceeding with a detailed description of the device illustrated in the drawings it will be explained that the device to be described is lowered through the liquid in a well bore to the level at which it is desired to clean perforations, a packer on the device sealing the casing bore at a point adjacent but slightly below the perforations to be cleaned. The device is then anchored in that position, or if at the bottom of the well, it is permitted to rest on the bottom. A chamber in the device is then opened. Since this chamber is filled with air or gas at the surface the pressure is relatively low compared with the pressure in the well. Hence, when the chamber is opened the high pressure of the well causes a violent rush of liquid to the interior of the chamber. Part of this liquid comes through the adjacent perforations, bringing with it the debris from those perforations. The remainder of the liquid comes from the liquid column within the casing above the seal, hence creating a velocity head in the fluid above the seal. When the chamber is filled the flow thereto ceases abruptly. The velocity head of the column of liquid above the seal must, however, be dissipated in some manner. The second stage of the process of the invention then takes place by virtue of the velocity head of the superposed liquid which causes a violent surge of liquid outwardly through the perforations immediately above the seal, thus dislodging particles therefrom and rearranging the detritus in the producing formation adjacent the perforated sections of the pipe.

In another embodiment of the invention arrangements are made to rely only upon the application of a violent suction to the screen section below a seal whereby highly desirable and successful results are accomplished.

Reference is particularly directed to Figs. 7 and 8 of the drawings which show an assembly view of the device of the invention. 1 represents the well casing in which clogged openings are to be cleaned. The device comprises essentially a casing including the barrel portion 2 having a closed substantially airtight chamber 3 therein, a sleeve 4, a packer assembly 5 and an anchoring mechanism 6. The details of these component parts and their operation are best illustrated in Figs. 1 to 4, and reference is now made thereto. The upper end of the barrel 2 is provided with a bail end 7 whereby the device may be lowered within the well casing 1 by means of a flexible line such as the wire line 8. Flutes or beads 9 are also provided to enable the device to be engaged by a fishing tool in case wire line 8 should become detached.

The head of the barrel 2 is also provided with a central bore 10 having an upwardly facing seat on which is positioned a valve 11. This valve is resiliently retained upon its seat by a compression spring 12, the tension of which is adjustably maintained by a plug 13 threadably retained within the bore 10. Ports 14 permit the flow of fluid from the chamber 3 when valve 11 is open. The purpose of this valve will become apparent as the description proceeds.

The sleeve 4 has a reduced end section 20 which telescopically fits within the lower end of the barrel 2 and terminates in a plurality of spaced gripping fingers 21 having outwardly projecting portions 22 near their ends. These projections contact with an inwardly extending ridge 23 in the barrel 2 when the relative position of the parts is that shown in Figs. 1 and 7, hence holding fingers 21 from outward movement. An outwardly extending projection 24 on each of the fingers cooperates with a complementary flange 25 on the barrel 2 to retain the parts in assembled relation.

Below flange 25 a packing material 26 is placed between the barrel 2 and tubular section 20 and is held in place by a packing gland 27 whereby leakage of fluid through the sliding connection between the barrel and sleeve is prevented. A spring 28 upon tubular section 20 of the sleeve 4 presses against gland 27 and shoulder 29 of sleeve 4 and retains the barrel and sleeve in such relative position that projections 24 and flange 25 are held in contacting relation.

Within the assembly just described is a valve generally designated as 30. Valve stem 31 is guided at its upper end between tubular projections 32 extending inwardly from the walls of the chamber 3, balls 33 within these projections being pressed inwardly against the valve stem 31 by means of springs 34. At the lower end of the valve stem are downwardly facing valve cups 35 which seal the bore of tubular section 20, and are securely attached to the valve stem by a nut 37 having a spherical head. With this construction the spherical end portion of the nut serves as a deflector of fluid moving upwardly through the valve at high velocity and hence protects cups 35 from destruction from this high velocity fluid stream.

As is clearly shown in Fig. 1, fingers 21 have inwardly extending projections 40 which engage a ridge 38 on valve stem 31 when the projecting portions 22 of the fingers ride upon ridge 23. It should be noted that the valve cups 35 are positioned below the slots 41 between fingers 21 when the device is set as shown in Fig. 1. Hence liquid cannot enter chamber 3 when the device is so set. It should be noted that valve 30 is operated entirely and depends solely for its operation upon the differential pressure between the outside and inside of the barrel. This differential pressure tends at all times to move the valve upward and such action takes place to accomplish desired functioning of the apparatus at the instant the ridge 38 on valve stem 31 is released from projections 40 by the telescoping movement of barrel 2 over tubular extension 20 on sleeve 4.

Sleeve 4 is provided with a rotatable ferrule 42 and the sleeve and ferrule are provided with one or more openings 43. These openings may be placed in mating relation by rotations of the ferrule relative to sleeve 4. This construction is provided in order to enable removal of fluid and debris from chamber 3 when the device is withdrawn from the well.

A flap valve 44 is also provided within the sleeve 4 to retain material which has passed above this point. In this manner a sand chamber is provided between valve 30 and flap valve 44. Below flap valve 44 is provided a second ferrule 45 similar to ferrule 42 above described. This second ferrule and the sleeve are provided with openings 46 which admit liquid to the interior of the device when the cleaning operation takes place. It is thus apparent that when the device is lowered into the well to effect a cleaning operation the openings in ferrule 45 are brought into registry with openings 46 in sleeve 4.

A valve member 50 is threadably secured to the lower end of sleeve 4 and comprises a stem 51 and a head 52 which extends into an enlargement 55 in the bore of packer mandrel 60. The upper face of the valve head normally engages downwardly facing shoulder 53 of the mandrel 60 by virtue of a compression spring 54 which surrounds valve stem 51 and tends to hold the upper face of the valve and shoulder 53 in engagement.

Packer mandrel 60 is of hollow construction and the enlargement 55 of the central bore at its upper end provides a valve seat 61 to receive a complementary surface on valve head 52. Ports 62 permit fluid to flow outwardly from within the mandrel bore when this valve is opened. Near the lower end of the mandrel 60 are ports 63. With this arrangement it is apparent that fluid within the casing 1 may enter ports 63, as indicated by arrows 64, and move upwardly therein and out through ports 62, hence providing a by-pass of liquid past a sealing member comprising a packer 65 that is secured upon mandrel 60 between these ports.

It should be noted, however, that packer 65 is of such dimensions that it will normally scarcely touch the walls of casing 1. As the device may be repeatedly lowered into and withdrawn from a well it is obvious that if the packer is constantly pressed against the casing rapid deterioration of the packer would occur. The packer will, however, serve its intended purpose even though it scarcely contacts or even fails to contact the casing walls during movement within the well bore.

The anchor, generally designated as 6, comprises a plurality of slips 70 slidably mounted upon the tapered faces 71 of slip guide 72. Channels 73 in the surface of the slip guide 72 permit passage of members 74 attached to slips 70 and to the collar 75 slidably mounted upon tubular extension 76 extending downwardly from the slip guide. A spring 77 abuts an annular shoulder 78 on tubular extension 76 and presses upwardly against collar 75, thus tending to force slips 70 upwardly and outwardly into engagement with the casing 1. Such action is prevented by bar springs 79 which are attached at their opposite ends to collar 75 and to a stop collar 80. This assembly is latched against upward movement by a latch member 81 within the bore of the tube 76. The latching tip of member 81 is urged downwardly by tension spring 82. Bar springs 79 bow outwardly and contact with the inner wall of the casing 1. These springs hence serve to guide the device within the casing and also to hold slips 70 in inoperative position during the lowering of the device into the well.

At the lower end of tubular extension 76 is provided a shoe 83 upon which the device is permitted to rest when the bottom of the bore hole is used to fix the position of the device in the well.

In the modification shown in Fig. 9 valve member 51 is shown as having an inner bore 90 whereby fluid may be permitted to pass upwardly from below packer 65. The operation of this modified form and the advantages accruing therefrom will be pointed out in connection with the operation of the device.

Before lowering the above described device into a well to perform a cleaning operation valve 30 is set in its lowermost position and is held in that position by means of gripping fingers 21. Opening 43 is closed and ferrule 45 is rotated upon the sleeve 4 until the openings therein are in mating relation.

While the device thus set is being lowered within the casing 1 slip jaws 70 are retained in retracted position as indicated in Fig. 2. It is apparent that since packer 65 does not contact the walls of casing 1, some of the fluid within the casing leaks past the packer. Movement of the fluid past the packer is, however, enhanced by the by-pass of fluid inwardly through ports 63 and outwardly from the packer mandrel through ports 62. In this manner the resistance to movement of the device through the liquid in the casing 1 is small.

When the device has reached the desired predetermined level an upward pull is exerted upon wire line 8 to lift the device a short distance. Wall engaging members shown as bar springs 79, by virtue of their frictional contacts with the walls of casing 1, will cause stop collar 80 to move downwardly relative to extension 76 whereupon latch 81 will operate to permit stop collar 80 to slide freely upon extension 76. The device is then lowered, whereupon the combined action of spring 77 and bar spring 79 will cause slips 70 to move upwardly upon the slip guide and engage the inner walls of the well casing and anchor the device against downward movement.

It should be noted at this point that spring 28 is stronger than spring 54. Hence, further downward movement of wire line 8 will permit spring 54 to become compressed and valve head 52 will engage valve seat 61, and in this manner cooperate with packer 65 to completely close the well bore at this level. Continued lowering movement of wire line 8 will cause spring 28 to become compressed by the telescoping of barrel 2 over tubular extension 20. When the projections 22 on the gripping fingers 21 pass beyond ridge 23 valve 30 will be released and the pressure within the well will cause the valve to move upwardly automatically until fluid is admitted to chamber 3 through the slots between the fingers 21. Because of the extreme differences of pressure between the inside and outside of the barrel 2 there will be a rapid flow of liquid into the barrel through ports 46, thus creating a suction upon the screen adjacent these ports. As explained above, this action also creates a velocity head in the column of liquid above seal 65 and in this manner the violent suction is closely followed by an outward surge of fluid through the adjacent perforations in the well casing. As the inlet ports 46 are above the sealing member or packer 65, and because there is no seal between the outer wall of the cleaner and the inner wall of the well casing above the packer, the column of liquid above the latter may have a substantially unobstructed downward velocity flow when the main valve of the tool is opened. By "unobstructed flow" I mean that the flow is not prevented by such sealing members as packers, or the like, and the flow is unobstructed even though there may be certain parts of the cleaner extending outwardly from the wall thereof above the packer.

By virtue of the successive actions above described the perforations in the well casing above the packer 65 and the channels in the subjacent material are effectively freed from the clogging material. This outward surge is of extreme intensity but of short duration. Fluid displaced by the surge will tend to move downwardly against packer 65 which, because of its configuration, will be pressed outwardly against the casing to form an effective seal. The outward surge of fluid is thus confined to the perforations above packer 65.

Figure 9:
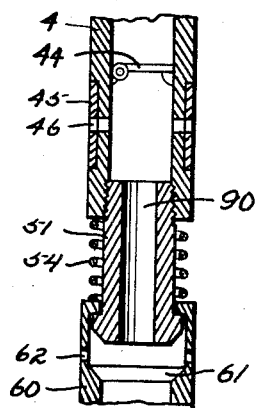
Fig. 9 is a vertical section of a modified form of the device.

When the modified form of the device as illustrated in Fig. 9 is used the device is adjusted as described in connection with Figs. 1 to 4. Ferrule 45, however, is turned so that ports 46 will be closed. The device is then lowered into the well and anchored as described above. When valve 30 is released as described the fluid entering chamber 3 will be drawn through ports 64 below packer 65 and hence violent cleaning action is produced upon the perforations at that level. When this modification is used it is apparent that the device will be set at such a level that the perforations to be cleaned will be immediately below packer 65. The fluids confined in chamber 3 when the device is operated within a well in entrapped at a very high pressure. As the device is withdrawn the pressure on the outside of barrel 2 decreases thus creating a differential pressure between the walls of the barrel. In order to prevent this differential pressure from reaching dangerous proportions, valve 11 is adjusted to operate under a suitable safe pressure to permit fluid to flow outwardly through ports 14. It is therefore apparent that the maximum differential pressure that can exist between the inside and the outside of barrel 2 is controlled by valve 11.

It is understood that the embodiment of the invention as above described is only one of many

4                                                            2,178,161 embodiments that the invention may take and the invention is not limited in its practice nor in the claims to the particular embodiment set forth.

What is claimed is:

1. In the cleaning of perforated pipe having a column of liquid above the perforations the method which comprises sealing the bore of the pipe with a packer below the perforations therein, displacing a portion of the column of liquid adjacent the perforations in the pipe, suddenly reducing the displacement volume whereby material is drawn through the perforations and the superposed column of liquid is accelerated downwardly and suddenly stopping the reduction of the displacement volume whereby fluid surges outwardly through the perforations above the packer.

2. The method of cleaning perforated pipe and the like which comprises placing a packer in said pipe below the perforations to be cleaned and within a column of liquid in the pipe, suddenly applying a violent suction within the pipe above said packer to simultaneously draw material through the perforations and accelerate downwardly the column of liquid above the packer and abruptly terminating said suction whereby liquid surges outwardly through the perforations above the packer during spending of the velocity head of the moving liquid.

3. The method of cleaning well strainers which comprises sealing the bore of the strainer with a packer adjacent the area to be cleaned, suddenly applying a violent suction within the strainer above the packer whereby material is drawn through the strainer and the superposed column of liquid is accelerated downwardly and abruptly terminating said suction whereby the velocity head of the superposed column creates a surge outwardly through the strainer above the packer.

4. The method of cleaning a perforated pipe which comprises sealing the pipe with a packer below the area to be cleaned and successively applying suction and an outward surge to the perforations above the packer.

5. In a strainer cleaning device the combination of a casing having a bottom inlet, a valve within said casing forming an upper air tight chamber, packer means for sealing the bore of the well below said inlet, means for anchoring the device with the packer below the perforations to be cleaned and means for opening said valve when the device is anchored at the cleaning level, whereby a violent suction through the strainer is followed by an outward surge of liquid from the velocity head of a superposed column of liquid.

6. In a strainer cleaning device the combination of a casing having an air chamber with an inlet, a valve in said chamber for controlling said inlet, means for holding said valve in closed position while the device is lowered into a well, slip means carried by said casing for rigidly anchoring a portion of the device to the well casing at a predetermined level in the well, and means for releasing said valve holding means when said portion of the device is anchored in place.

7. In a device for the described purpose the combination of a casing comprising telescoping sections which provide an upper air chamber and a lower sand chamber, a valve between said chambers and a valve at the lower end of said sand chamber, means on the lower of said sections for engaging the first mentioned valve to hold the valve closed when the device is lowered into a well and means for telescoping said section when a predetermined level is reached to release said first mentioned valve to admit liquid to the chambers.

8. In a device for cleaning perforated well pipe, a casing comprising telescoping sections and having an air chamber and a sand chamber with a flow control valve between said chambers, means connected with one of said sections extending to the surface of the well for lowering the device therein, means actuated to anchor the other of said sections to the interior of the well pipe by successive upward and downward movements of said lowering means, said valve comprising a stem with sealing means thereon, gripping fingers on one of said sections for holding said valve in predetermined position, and means for releasing said fingers by telescoping movement of said sections after said other section is anchored by lowering said first named means, whereby fluid is admitted to said chambers by opening of the valve under well pressure.

9. In a tool for cleaning perforations in a well pipe, a casing including a closed substantially airtight chamber having an inlet thereto, a closure for said inlet, said tool having relatively movable members, means extending to the surface of the well for lowering said tool therein, means on one of said members for rigidly anchoring the same to the interior of the well pipe upon successive upward and downward movements of said lowering means, and means for effecting the opening of said inlet by relative movement of said members upon a subsequent downward movement of said lowering means after the anchoring of said one of said members.

10. In a tool for cleaning perforations in a well pipe, a casing including a closed substantially airtight chamber having an inlet thereto, means on the upper end of said casing for the attachment of a flexible lowering line, means for closing said inlet when the tool is being lowered into the well by said line, said tool having relatively movable members, means on one of said members for rigidly anchoring the same to the interior of the well pipe upon successive upward and downward movements of said lowering means, and means for effecting the opening of said inlet by relative movement of said members upon a subsequent downward movement of said lowering means after the anchoring of said one of said members.

11. In a tool for cleaning perforations in a well pipe, a casing including a closed substantially airtight chamber having an inlet thereto, said casing comprising relatively movable sections, means extending to the surface of the well for lowering said tool therein, a valve for controlling said inlet, means for holding said valve in position to close said inlet when the tool is being lowered into the well, means on one of said sections for rigidly anchoring the same to the interior of the well pipe upon successive upward and downward movements of said lowering means, and means for releasing said valve holding means by relative movement of said sections upon a subsequent downward movement of said lowering means after the anchoring of said one of said sections.

12. In a tool for cleaning perforations in a well pipe, a casing including a closed substantially airtight chamber having an inlet, means on the upper end of said casing for the attachment of a flexible lowering line, means for closing said inlet when the tool is being lowered into the well by said line, and means including a member egaging the interior of the well pipe operable when the downward movement of the lowering line is checked, then raised upwardly and subsequently lowered, for effecting the opening of said inlet, when the cleaner has reached the desired depth in the well.

13. In a tool for cleaning perforations in a well pipe, a casing a including a closed substantially airtight chamber having an inlet, means on the upper end of said casing for the attachment of a flexible lowering line, means for closing said inlet when the cleaner is being lowered into the well by said line, normally retracted means on said casing for anchoring the tool to said pipe, including a member released to engage the interior of the well pipe when the downward movement of said line is checked, and then raised upwardly, and means for effecting the opening of said inlet when said line is subsequently lowered.

14. In a tool for cleaning the perforations in a well pipe, a casing including a closed substantially airtight chamber having an inlet, means on the upper end of said casing for the attachment of a flexible lowering line, means for closing said inlet when the tool is being lowered into the well by said line, means for engaging the interior of the well pipe to anchor the tool thereto, means for maintaining said anchoring means in retracted position while said line is being lowered, and for releasing said anchoring means when the downward movement of said line is checked, and then raised upwardly, and means for moving the released anchoring means into tight engagement with the interior of the well pipe and for effecting the opening of said inlet when said line is subsequently lowered.

15. In apparatus for cleaning the perforations of well pipe at a selected area above the bottom of a well having a column of fluid above the perforations to be cleaned, a packer for closing off the pipe below the perforations to be cleaned, a cleaner having a casing including a closed substantially airtight chamber having an inlet thereto including an opening in the casing above said packer, a closure for said inlet, means for opening said inlet to cause a rapid flow of well fluid to said chamber, said cleaner providing for substantially unobstructed downward velocity flow of the head of well fluid around the same above said packer when said inlet is opened, whereby the velocity of downward flow of the well fluid will cause the fluid to surge outwardly through the perforations in the well pipe adjacent to and above said packer when the flow of fluid into said chamber ceases.

DARRELL H. BLAIR.